United States Patent Office

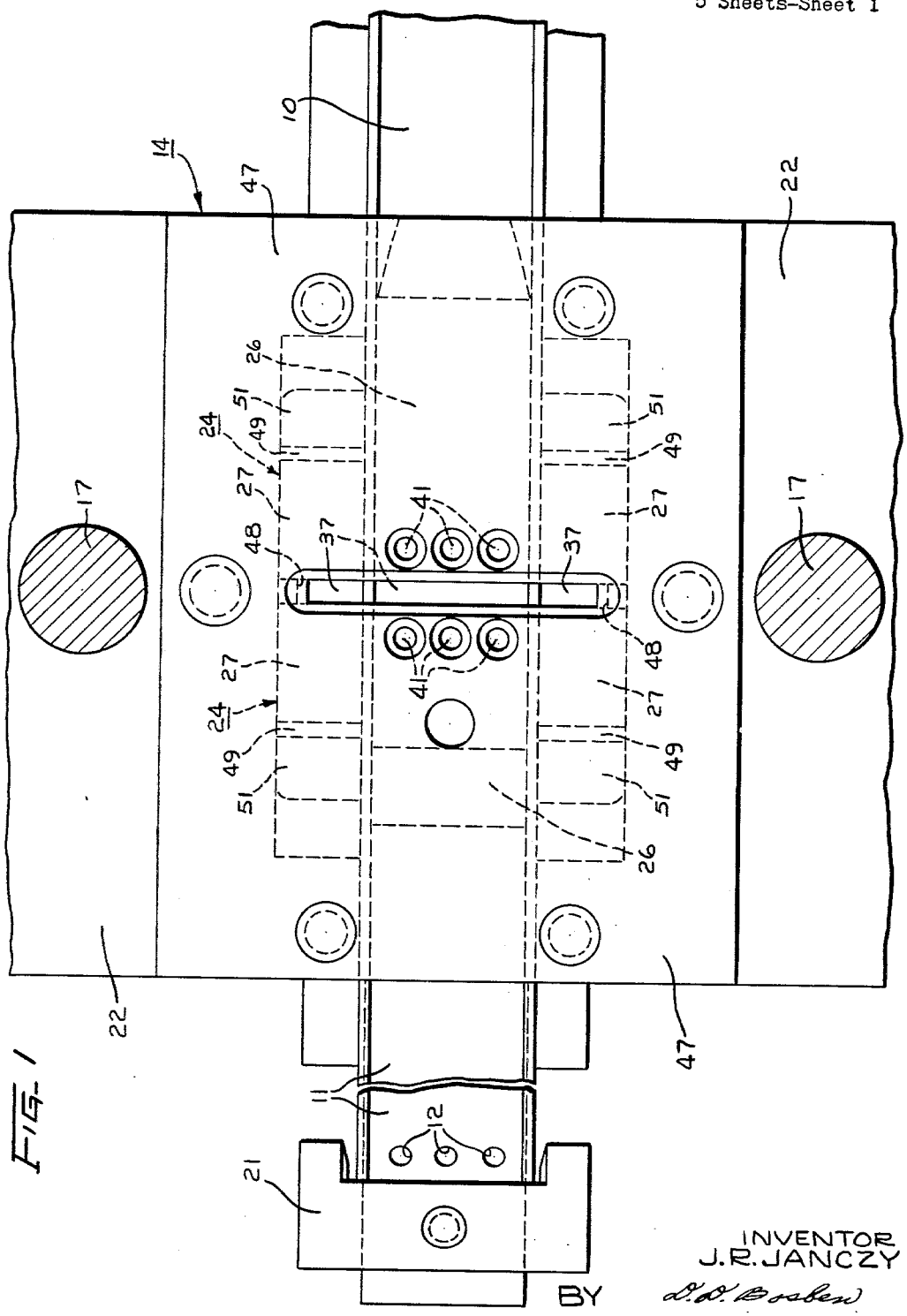

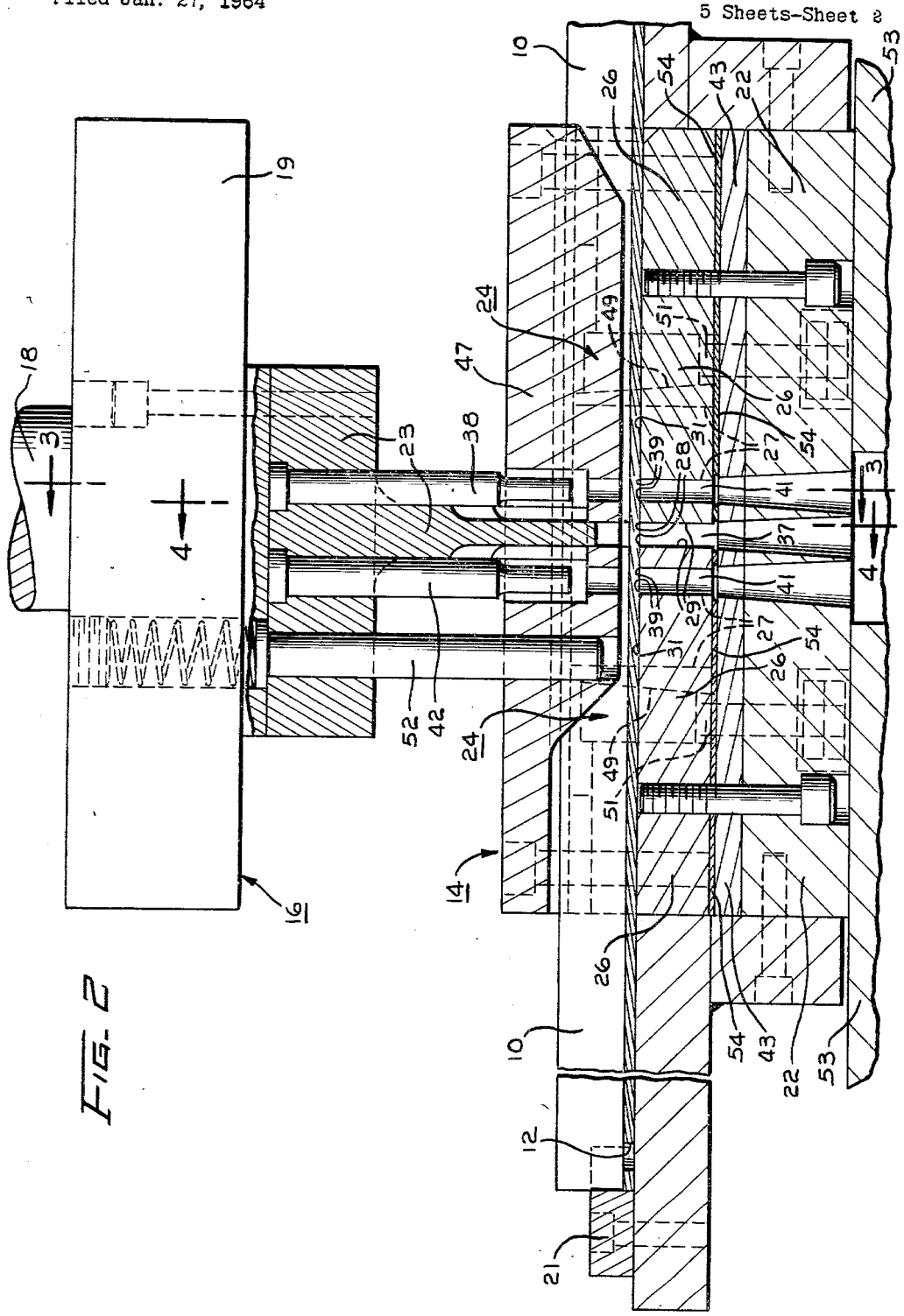

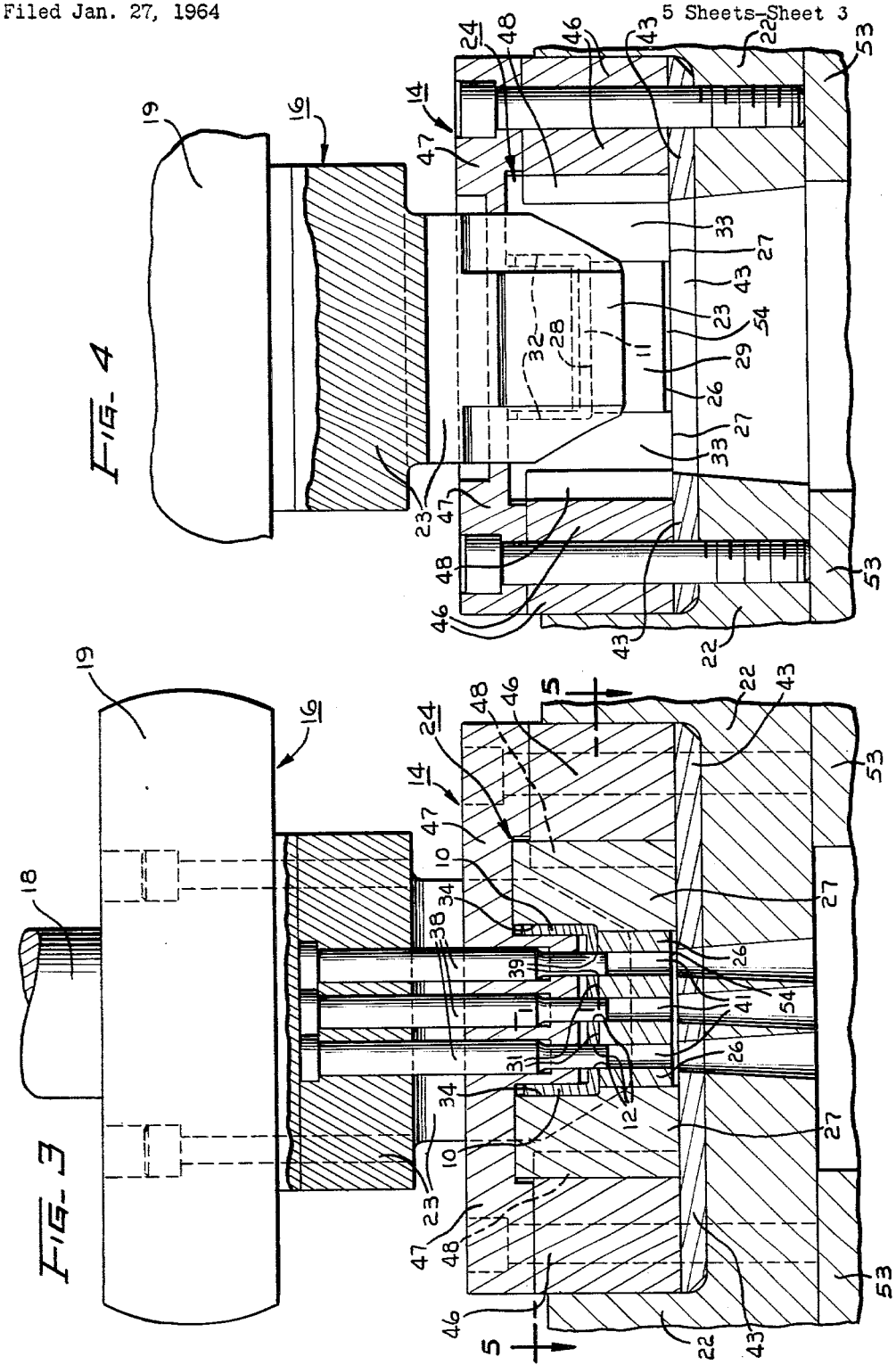

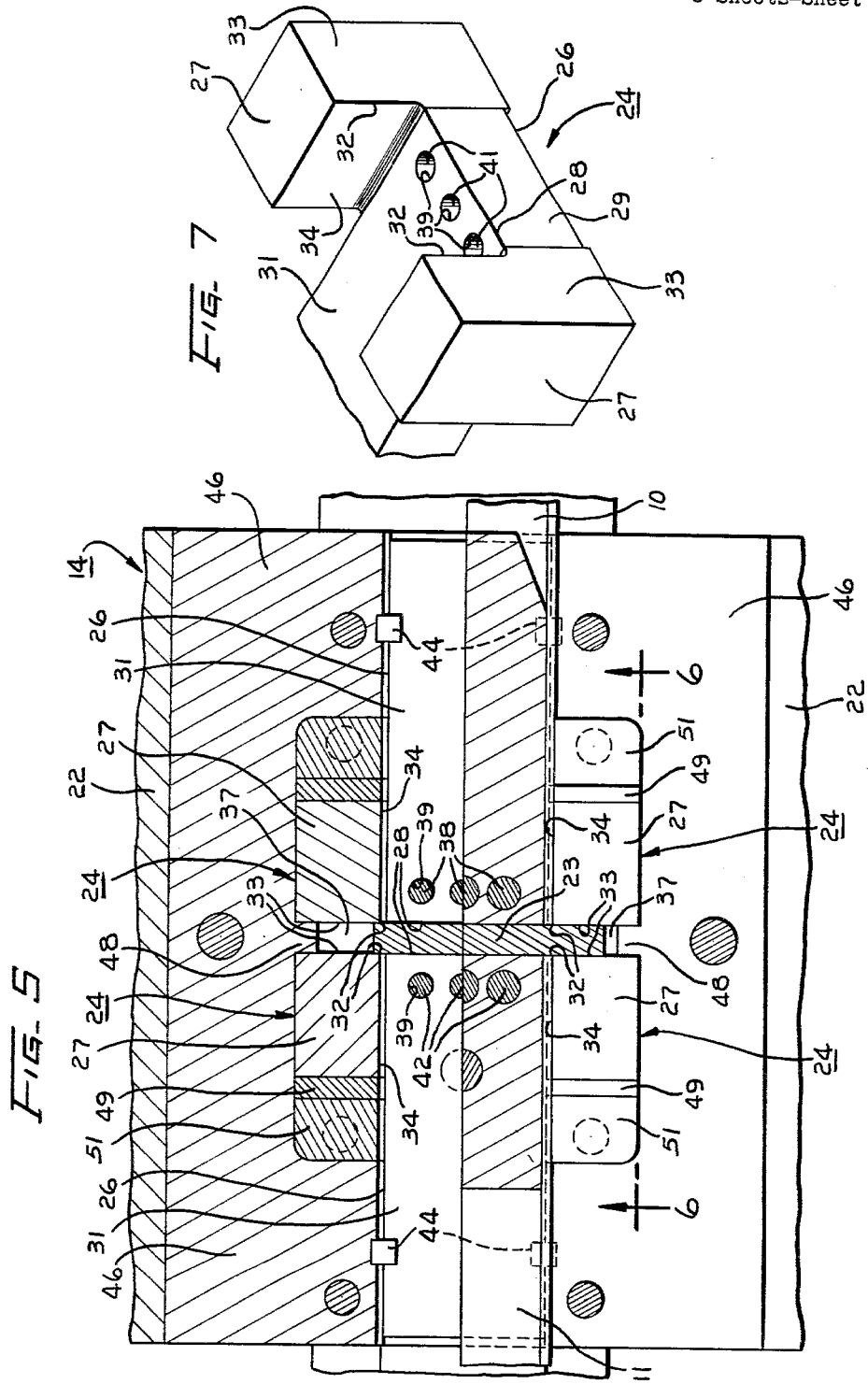

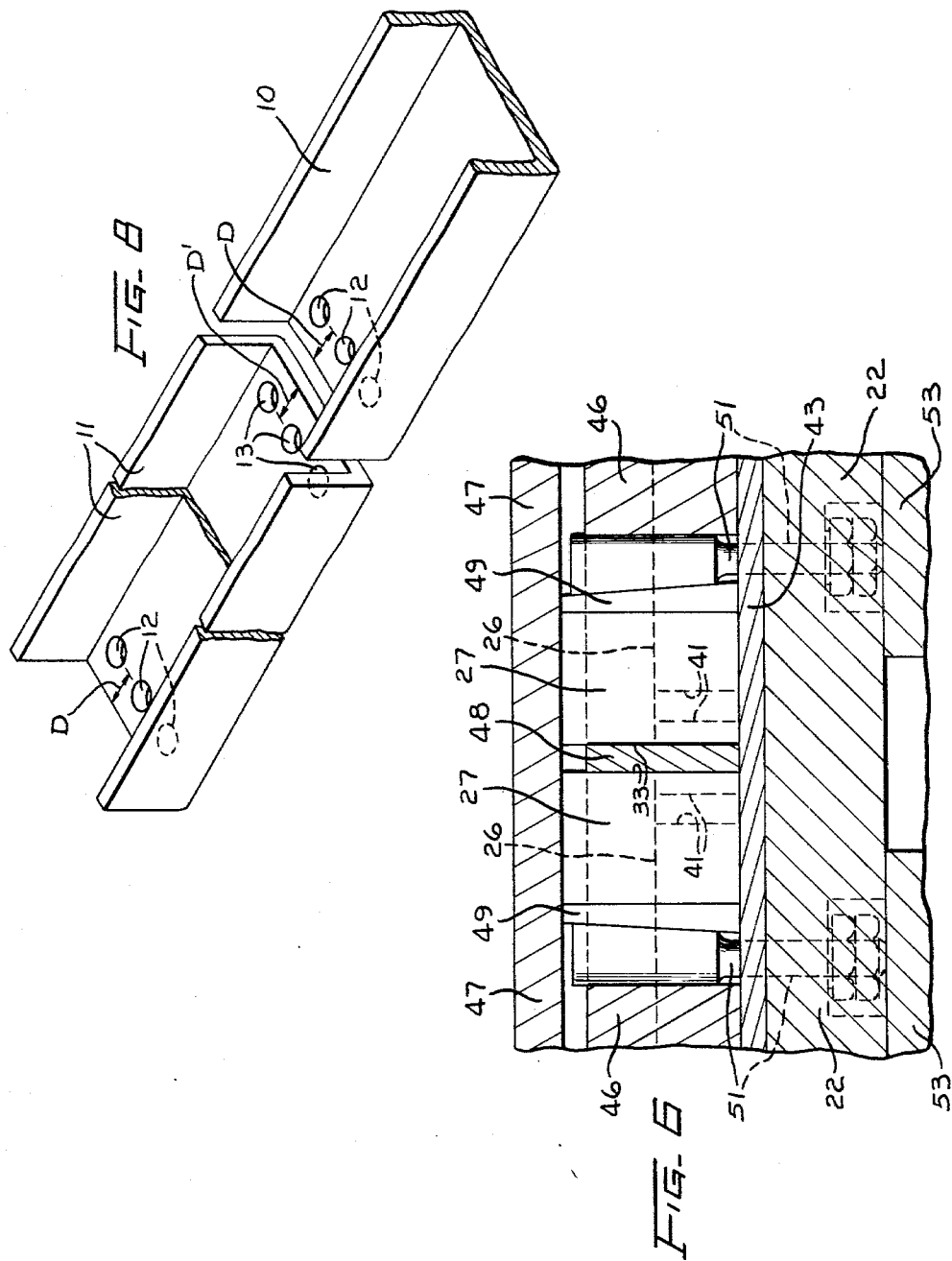

3,248,988
Patented May 3, 1966

3,248,988
APPARATUS FOR FORMING A PIECE PART
FROM STOCK MATERIAL
John R. Janczy, Omaha, Nebr., assignor to Western Electric Company, Incorporated, New York, N.Y., a corporation of New York
Filed Jan. 27, 1964, Ser. No. 340,296
9 Claims. (Cl. 83—682)

This invention relates to apparatus for forming a piece part from stock material, and more particularly to apparatus for forming a piece part from stock material having at least two intersecting portions wherein the completed piece part, in addition to having at least two intersecting portions, also has at least one opening formed therein. It is an object of this invention to provide new and improved apparatus of this character.

In certain channel-shaped frame members used in telephone switching frames, each of the frame members has mounting apertures extending through a base portion thereof adjacent opposite ends of the base portion with the axes of the apertures located at prescribed distances from their adjacent ends. In manufacturing these frame members, it is standard practice to shear the frame members to length from stock material and to perforate the apertures in the frame members in two separate operations.

More specifically, the shearing of the frame members is accomplished in punch and die apparatus including a pair of U-shaped one-piece die members having opposed surfaces which define a slot for receiving a shearing punch member, and having additional surfaces which intersect the opposed surfaces to define shearing edges. As the stock material is intermittently advanced through the punch and die the shearing member is moved into the slot defined by the opposed die surfaces and cooperates with the shearing edges to shear the frame members from the stock material one at a time.

The apertures in the base portions of the parts are formed by perforating punch and die apparatus separate from the shearing punch and die after the shearing operation. This perforating punch and die includes die members having openings in top surfaces thereof for receiving perforating punches and which define cutting edges cooperable with the punches for forming the apertures in the parts.

In the shearing apparatus described above, when it is necessary to sharpen the shearing edges of the U-shaped one-piece die members, the die members are disassembled from the apparatus and a uniform thickness of material is removed from each of the opposed surfaces of the die members, as for example by a grinding operation. The die members then are relocated in the apparatus with the sharpened shearing edges in their original positions with respect to one another and the shearing punch member so that they still can cooperate with the punch member for the shearing of the frame members from the stock material. Similarly, to sharpen the cutting or perforating edges of the die members in the above described perforating apparatus, a uniform thickness of the top surface of each die member is removed therefrom.

Heretofore, the shearing of the frame members from the stock material and the forming of the apertures in the frame members had to be accomplished in two separate operations, as above described, because if openings were provided in the U-shaped one-piece shearing die members for receiving perforating punches for forming the apertures in the frame members, so that the shearing and perforating operations could be performed simultaneously, it no longer would be possible to sharpen the shearing edges of the die members merely by grinding down the opposed surfaces thereof, for various reasons.

For example, upon relocating the die members in the apparatus so that their sharpened shearing edges would be in proper position to cooperate with the shearing member, the punch receiving openings would not be in proper alignment with their associated perforating punches. In addition, the spacing of the axes of the punch receiving openings from the shearing edges of their associated die members would have been changed such that the openings could not be used to form the apertures in the frame members at the prescribed distances from their adjacent ends of the members. Further, it would be difficult to sharpen the cutting or perforating edges defined by the punch receiving openings in the U-shaped die members and still maintain the proper configuration of the die members.

Accordingly, another object of this invention is to provide new and improved apparatus for shearing piece parts from channel-shaped stock material and for forming apertures in the parts adjacent their opposite ends and at prescribed distances from the ends as the stock material is intermittently advanced through the apparatus.

A further object of this invention is to provide new and improved apparatus for forming piece parts from stock material having at least two intersecting portions as the stock material is advanced through the apparatus, wherein each of the parts is to have spaced openings formed therein.

A still further object of this invention is to provide new and improved apparatus for forming a piece part from stock material having at least two intersecting portions wherein the part is to have at least one opening formed therein at a prescribed distance from one end of one of the intersecting portions of the part.

Another object of this invention is to provide new and improved apparatus for forming a piece part from stock material having at least two intersecting portions wherein the piece part is to have at least one opening formed therein.

A further object of this invention is to provide new and improved apparatus for forming a piece part from stock material having at least two intersecting portions wherein the part is to have at least one opening formed therein, in which the sharpening of forming edges for performing the forming operations readily can be accomplished.

A still further object of this invention is to provide new and improved apparatus for forming a piece part from stock material having at least two intersecting portions wherein the part is to have at least one opening formed therein, in which forming edges for performing the forming operations readily can be relocated in the apparatus in their original positions with respect to one another and the remainder of the apparatus after being sharpened.

In accordance with the invention, apparatus for forming a part from stock material having at least two intersecting portions, wherein the part is to have at least one opening formed therein, includes first and second forming members and a multi-unit die subassembly. The die subassembly includes first and second die members each defining a forming edge cooperable with the first forming member to form a respective one of the intersecting portions of the stock material upon relative movement between the first forming member and the die members. The first die member also includes a forming edge defined by an opening in a surface thereof and cooperable with the second forming member for the forming of the opening in the part. The arrangement of the die members is such that they can be removed from the apparatus and their forming edges readily can be sharpened, whereupon the die members readily can be relocated in the apparatus with the sharpened forming edges in their original positions with respect to one another and the remainder of the apparatus.

A preferred embodiment of the invention is designed for forming channel-shaped parts from channel-shaped stock material as the stock material is intermittently advanced through the apparatus, wherein each of the parts is to have apertures extending through a base portion thereof adjacent opposite ends of the base portion with the central axes of the apertures located at prescribed distances from the ends. The apparatus includes a shearing member, perforating members on opposite sides of the shearing member, and a pair of multi-unit die subassemblies cooperable with the shearing member and the perforating members, respectively, to shear the parts from the stock material and to form the apertures in the parts.

The multi-unit die subassemblies include first die members having spaced parallel surfaces defining a portion of a slot for receiving the shearing member during a shearing operation, and having coplanar surfaces intersecting respective ones of the opposed surfaces to define shearing edges cooperable with the shearing member for shearing the base portion of the stock material upon movement of the shearing member into the slot. The die subassemblies also include second die members at opposite sides of the first die members and having opposed surfaces which define additional portions of the shearing member receiving slot and which intersect coplanar surfaces of the die members to form shearing edges which are cooperable with the shearing member to shear the legs of the channel shaped stock material upon movement of the shearing member into the slot. The first die members also have apertures therethrough and opening through the coplanar surfaces thereof to define cutting edges which are cooperable with the perforating members to form the apertures in the base portions of the parts upon movement of the perforating members into the apertures in the die members.

The arrangement of the first and second die members is such that they can be removed from the apparatus for sharpening of their shearing and cutting edges, with the shearing and cutting edges of the first die members being sharpenable by the grinding down of the coplanar surfaces thereof and with the shearing edges of the second die members being sharpenable by the grinding down of the opposed surfaces thereof. After a sharpening operation the first and second die members can be relocated in the apparatus with the sharpened edges in their original positions with respect to one another and the remainder of the apparatus.

This invention, together with further objects and advantages thereof, will best be understood by reference to the following detailed description taken in connection with the accompanying drawings in which:

FIG. 1 is a plan view of a die assembly of the apparatus, partially in cross section and partially broken away;

FIG. 2 is a side elevational view of the apparatus in cross section, taken substantially along its center line, showing the apparatus before a shearing and perforating operation;

FIG. 3 is a cross sectional view taken substantially along the line 3—3 of FIG. 2, but showing the apparatus after a shearing and perforating operation;

FIG. 4 is a cross sectional view taken substantially along the line 4—4 of FIG. 2, but also showing the apparatus after a shearing and perforating operation;

FIG. 5 is a cross sectional view taken substantially along the line 5—5 of FIG. 3;

FIG. 6 is a partial cross sectional view taken substantially along the line 6—6 of FIG. 5;

FIG. 7 is an isometric view of a multi-unit die subassembly; and

FIG. 8 is an isometric view of a completed piece part and a strip of stock material as they appear in one stage of the manufacturing process.

Referring to FIG. 8 of the drawings, it is seen that the illustrated embodiment of the invention is designed for shearing and perforating channel or substantially U-shaped stock material 10 to form frame members 11 (only one shown) of varied lengths and of a type used in telephone switching frames. The stock material 10 and each of the frame members or parts 11 include a base portion and upstanding legs which intersect the base portion at their lower ends, as viewed in FIG. 8. Each of the parts 11 also has sets of mounting apertures 12 and 13 formed through the base portion thereof adjacent the opposite ends of the part. The central axes of the apertures 12 and 13 in each part or frame member 11 are located at prescribed distances D and D', respectively, from the ends of the member, the distances D and D' in the case of the frame members 11 being equal to one another.

More specifically, as the stock material 10 is intermittently advanced through the apparatus from right to left, as viewed in FIGS. 1 and 2, either manually or by a suitable feed mechanism which is not shown, the apparatus is designed to perform shearing and perforating operations on the stock material substantially simultaneously to shear the parts 11 to a desired length from the stock material 10 one at a time, and to form the apertures 12 and 13 in the parts in the desired locations. For this purpose, referring to FIGS. 1–4, it is seen that the apparatus includes a fixed lower die assembly 14 and an sembly 16 which is vertically reciprocal relative to the die assembly on suitable vertical guide posts 17 (FIG. 1) by a suitable operating mechanism (not shown) connected by a vertical shaft 18 (FIGS. 2 and 3) to a mounting block 19 of the punch assembly.

As the stock material 10 is advanced through the apparatus, its leading end engages an adjustable stop member 21 adjacent the left-hand side of the apparatus, as viewed in FIGS. 1 and 2, the stop member being mounted on a base member 22 of the lower die assembly 14 by means of a bracket as shown in FIG. 2 so as to locate the stock material in the proper position in the apparatus for a shearing and perforating operation. The punch assembly 16 then is moved vertically downward relative to the die assembly 14 and the punch and die assemblies 14 and 16 cooperate to shear one of the parts 11 from the stock material 10, to form a set of the apertures 13 in the part, and to form a set of the apertures 12 for the next part in the stock material adjacent the newly severed end of the stock material. The condition of the stock material 10 and the newly formed part 11 at this time is shown in FIG. 8, the apertures 12 in the upper end of the part having been formed during the previous shearing and perforating operation. After the shearing and perforating operation is completed the newly formed part 11 is removed from the apparatus in a suitable manner and the stock material 10 again is advanced through the apparatus into engagement with the stop member 21 for the next shearing and perforating operation.

The shearing of one of the parts 11 from the stock material 10 is accomplished by a shearing punch member 23 (FIGS. 2 and 4) which forms a part of the upper punch assembly 16 and which extends transversely with respect to the path of movement of the stock material through the apparatus, and by a pair of spaced opposed die subassemblies 24 (FIG. 5) which form a part of the lower die assembly 14 and one of which is shown in FIG. 7.

Each of the die subassemblies 24 includes a central die member 26 and a pair of side die members 27 adjacent the opposite sides of the central die member. Each of the central die members 26 includes a horizontally extending shearing edge 28 defined by the intersection of a vertical end surface 29 and a horizontal top surface 31 thereof. Similarly, each of the side die members 27 includes a vertically extending shearing edge 32 defined by the intersection of a vertical end surface 33 and an inner substantially vertical side surface 34 thereof. As is best shown in FIGS. 2 and 3, the shearing member 23 is secured to the mounting block 19 by suitable screws positioned in apertures in the mounting block and threaded into an upper enlarged portion of the shearing member.

When the die subassemblies 24 are properly positioned in the lower die assembly 14, as shown in FIGS. 1–6, the vertical end surfaces 29 and 33 of each of the central die members 26 and its associated pair of side die members 27, respectively, are in coplanar relationship as illustrated in FIG. 7. Further, as is illustrated in FIGS. 4 and 7, the vertically extending shearing edges 32 of each pair of the side die members 27 form continuations of the horizontally extending shearing edge 28 of their associated central die member 26 to produce a U-shaped shearing edge configuration.

As is best shown in FIGS. 2 and 5, when the die subassemblies 24 are properly positioned in the lower die assembly 14 they are spaced apart with corresponding ones of the coplanar end surfaces 29 and 33 of the central and side die members 26 and 27 in opposed relationship and defining a vertical slot 37 for receiving the shearing member 23 in close fitting relationship between the subassemblies. Further, the top surfaces 31 of the central die members 26 are in coplanar relationship (FIG. 2) and engage the base portion of the stock material 10 on opposite sides of the slot 37, while corresponding ones of the inner side surfaces 34 of the side die members 27 are in coplanar relationship (FIG. 5) and engage the legs of the stock material on opposite sides of the slot. Thus, when the upper punch assembly 16 is moved vertically downward, as above described, the shearing member 23 engages the stock material and moves into the slot 37 and cooperates with the shearing edges 28 and 32 of the central die members 26 and the side die members 27 to shear one of the parts 11 from the stock material. More specifically, in the shearing operation the horizontally extending shearing edges 28 of the central die members 26 cooperate with the shearing member 23 to sever the base portion of the stock material 10, and the vertically extending shearing edges 32 of the side die members 27 cooperate with the shearing member to sever respective ones of the legs of the stock material.

Referring to FIGS. 2, 3 and 5, it is seen that the apertures 12 in the parts 11 are formed by a first set of perforating punches 38 of the upper punch assembly 16 located adjacent the right-hand side (FIG. 2) of the shearing member 23, that is, the side of the shearing member facing the direction from which the stock material 10 approaches, and by circular cutting edges 39 (best shown in FIG. 7) of the central die member 26 of the subassembly 24 beneath the perforating punches, the cutting edges 39 being defined by vertical punch receiving apertures 41 extending through the die member and opening through the top surface 31 thereof. Similarly, the apertures 13 in the parts 11 are formed by a second set of perforating punches 42 of the upper punch assembly 16 located on the opposite side of the shearing member 23, and by circular cutting edges 39 of the central die member 26 of the subassembly 24 beneath these punches. The vertical central axes of the punch receiving apertures 41 in the central die members 26 extend parallel to the vertical end surfaces 29 of the die members and are spaced therefrom the prescribed distances D and D' which the central axes of the apertures 12 and 13 in the parts 11 are to be located from the ends of the parts. The perforating punches 38 and 42 are mounted in the upper punch assembly 16 in any suitable manner, as for example in the enlarged upper portion of the shearing member 23, as shown in FIGS. 2 and 3.

Summarizing a shearing and perforating operation, with the stock material 10 positioned in the apparatus as shown in FIGS. 1 and 2, the upper punch assembly 16 is moved vertically downward relative to the fixed lower die assembly 14 to the position shown in FIGS. 3, 4 and 5. During this movement the shearing member 23 engages the material and is moved into the vertical slot 37 formed by the opposed end surfaces 29 and 33 of the central die members 26 and the side die members 27, with the shearing edges 28 and 32 of the die members cooperating with the shearing member as above described to sever one of the parts 11 from the stock material. After the stock material 10 has been sheared the perforating punch members 38 and 42, the lower ends of which are vertically above the lower end of the shearing member 23, engage the stock material and are moved into the vertical apertures 41 in the central die members 26, with the punches 42 cooperating with their associated circular cutting edges 39 to form a set of the apertures 13 in the part 11 being severed from the stock material, and with the punches 38 cooperating with their respective circular cutting edges 39 to form a set of the apertures 12 for the next part in the stock material adjacent the newly severed end thereof. The shearing of the stock material 10 is accomplished before the perforating of the apertures 12 and 13 because when these steps are carried out in this manner distortion of the stock material as a result of the shearing operation will be substantially less than it would be if they were carried out in the reverse order.

Referring to FIG. 2, it is seen that when the die subassemblies 24 are assembled in the lower die assembly 14 the central die members 26 of the subassemblies are secured to the base member 22 and to a plate member 43 positioned between the base member and the die members, by suitable screws disposed at their lower ends in apertures in the base member and the plate member and having their upper ends screw threaded into the die members. The central die members 26 also are secured against longitudinal movement by the means of vertical keys 44 (FIG. 5) disposed in opposed vertical keyways in the central die members and associated ones of a pair of channel-shaped transversely spaced yoke members 46. As is best shown in FIG. 4, the channel-shaped yoke members 46, the intermediate plate member 43 and a combination cover and stripper plate 47 of the lower die assembly 14 all are secured to the base member 22 by suitable screws.

Further, as is best shown in FIGS. 3 and 5, when the die subassemblies 24 are assembled in the lower die assembly 14 the side die members 27 of the subassemblies are disposed in recesses provided by the channel-shaped configuration of the yoke members 46, the recesses being bounded at their bottoms by the intermediate plate member 43 and at their tops by the stripper plate 47. As is best shown in FIGS. 5 and 6, the vertical end surface 33 of each side die member 27 is clamped against a stop element in the form of a vertically extending rib 48 on its associated yoke member 46 by a tapered wedge 49 and a bolt and nut assembly 51. The ribs 48 (FIG. 5) of the yoke members 46 provide opposed ends of the vertical slot 37 for receiving the shearing member 23 and are spaced from the path of travel of the shearing member to facilitate the shearing of the leg portions of the stock material 10 by the shearing member. Each of the bolt and nut assemblies 51 (FIG. 6) includes a vertically extending bolt disposed in vertically aligned apertures in the base member 22 and the intermediate plate member 43, the bolt having a tapered wedge portion at its upper end engageable with the associated tapered wedge 49 and having a tightening nut and a locking nut screw threaded on its lower end in a well known manner and disposed in a recess in the base member.

As is best shown in FIGS. 2 and 3, the side die members 27, the yoke members 46, the tapered wedges 49 and the tapered wedge portions of the bolt and nut assemblies 51 extend vertically upward with respect to the top surfaces 31 of the central die members 26 and, together with the central die members, form the bottom wall of a channel or U-shaped guide slot for the stock material 10 as it is advanced through the apparatus. The upper wall of this guide slot is formed by a longitudinally extending depending portion of the stripper plate 47.

The stripper plate 47 is designed to strip the stock material 10 and a severed part 11 from the shearing member 23 and the perforating punches 38 and 42 in a well known manner upon upward movement of the punch assembly 16 after the completion of a shearing and perforating operation. Further, the stripper plate 47 is provided with a vertical guide slot (FIGS. 1, 2 and 4) through which the shearing member 23 passes during a shearing and perforating operation, and also includes vertical guide apertures (FIGS. 1, 2 and 3) through which the perforating punches 38 and 42 pass during a shearing and perforating operation.

Referring to FIG. 2, it is seen that a part hold down pin 52, carried at its upper end in the enlarged portion of the shearing member 23 and biased downward by a coil spring in the mounting block 19, also is movable through a vertical guide aperture in the stripper plate 47 during a shearing and perforating operation to engage the part 11 being severed. The pin 52 thus helps prevent any substantial movement of the part 11 both during the shearing and perforating operation and as the punch assembly 16 initially is retracted upward after the shearing and perforating operation is completed.

When it is necessary to sharpen the shearing edges 28 and 32 of the central die members 26 and the side die members 27, and the circular cutting or perforating edges 39 of the central die members, the lower die assembly 14, which is removably mounted on a support table 53 in any suitable manner, is removed from the apparatus. The die assembly 14 then is disassembled and the central die members 26 and the side die members 27 are removed therefrom. The horizontally extending shearing edge 28 and the circular cutting edges 39 of each of the central die members 26 are sharpened by removing a uniform thickness of material from the top surface 31 of the die member, as for example by a grinding operation. Since the vertical central axes of the apertures 41 in each central die member 26 extend parallel to the vertical end surface 29 thereof, it is apparent that this grinding operation does not affect the spacing of the central axes of the apertures with respect to the end surface. Thus, when the grinding operations are completed the central axes of the apertures 41 still are spaced from the vertical end surfaces 29 the prescribed distances D and D' which the apertures 12 and 13 in the parts 11 are to be spaced from their adjacent ends of the parts. Similarly, to sharpen the vertically extending shearing edges 32 of the side die members 27, the vertical end surfaces 33 of the die members also are ground down to remove uniform thicknesses of material therefrom.

After the shearing edges 28 and 32 and the cutting or perforating edges 39 have been sharpened as above described, the lower die assembly 14 is reassembled so that when it is remounted in the apparatus the sharpened shearing and cutting edges will be in their original positions with respect to one another and the remainder of the apparatus, whereby they still can cooperate with the shearing member 23 and the perforating punches 38 and 42 to shear the parts 11 from the stock material 10 and to form the apertures 12 and 13 in the parts at the prescribed distances D and D' from the ends of the parts. This is accomplished with regard to the vertically extending shearing edges 32 of the side die members 27 by reclamping the ground down vertical end surfaces 33 of the die members against their respective stop elements or ribs 48 of the yoke members 46 by means of the tapered wedges 49 and the bolt and nut assemblies 51. The central die members 26 on the other hand, as shown in FIGS. 2, 3 and 4, are elevated upward by providing suitable shims or spacers 54 between the central die members and the intermediate plate member 43 so that the horizontally extending shearing edge 28 of each die member is at the proper elevation with respect to the vertically extending shearing edges 32 of the adjacent side die members 27, that is, so that the vertically extending shearing edges still form continuations of the horizontally extending shearing edge, as illustrated in FIG. 7. Thus, when the lower die assembly 14 is reassembled in the apparatus as shown in FIGS. 1–6, it is apparent that the sharpened shearing and cutting edges 28, 32, 39 will be properly positioned with respect to the shearing member 23 and the perforating punches 38 and 42.

In operation, assuming that the apparatus has been operating to form parts 11 with apertures 12 and 13 therein, at the beginning of a shearing and perforating operation the apparatus is in the position shown in FIG. 2 with the leading or left-hand end of the stock material 10, as viewed in FIGS. 1 and 2, in engagement with the stop member 21. At this time, the stock material 10 adjacent its leading end has apertures 12 therethrough which were formed in the preceding shearing and perforating operation.

The punch assembly 16 then is moved vertically downward by its operating mechanism (not shown) toward the die assembly 14 from the position shown in FIG. 2 to the position shown in FIGS. 3, 4 and 5. During this movement, the shearing member 23 is moved through its guide slot in the stripper plate 47 into engagement with the stock material 10 and then into the slot 37 formed by the opposed end surfaces 29 and 33 of the die members 26 and 27, and cooperates with the shearing edges 28 and 32 of the die members to sever a part 11 from the stock material. At the same time the perforating punches 38 and 42 are being moved through their guide apertures in the stripper plate 47, and after the part 11 has been sheared the punches engage the stock material 10 and move into the apertures 41 in the central die members 26, with the punches 42 cooperating with their respective circular cutting edges 39 to form a set of the apertures 13 in the part 11, and with the punches 38 cooperating with their respective circular cutting edges 39 to form a set of the apertures 12 for the next succeeding part 11 in the stock material adjacent its newly severed end. During this shearing and perforating operation, and during the initial portion of the subsequent retraction of the punch assembly 16 upward back to the position shown in FIG. 2, any substantial movement of the part 11 is prevented by the spring biased pin 52 being engaged therewith. The scrap material produced as a result of the shearing and perforating operation falls downward through the shearing member receiving slot 37 and the punch receiving apertures 41, and then through suitable openings in the intermediate plate member 43, the base member 22 and the support table 53 to a suitable receptacle, not shown.

After the shearing and perforating operation the punch assembly 16 is retracted vertically upward by its operating mechanism back to the position shown in FIG. 2, during which movement the stripper plate 47 strips the stock material 10 and the newly formed part 11 from the shearing member 23 and the perforating punches 38 and 42. The newly formed part 11 then is removed from the apparatus and the stock material 10 is advanced to the left (FIGS. 1 and 2) into engagement with the stop member 21 whereupon the cycle is repeated to form the next part 11.

While one embodiment of the invention has been disclosed, many modifications will be apparent and it is intended that the invention be interpreted as including all modifications which fall within the true spirit and scope of the invention.

What is claimed is:

1. Apparatus for forming a piece part from stock material having at least two body portions which extend at an angle with respect to one another, wherein the piece part is to have at least one aperture formed therethrough, which apparatus comprises:

a shearing member;
a perforating member adjacent said shearing member;
a first die member having a shearing edge cooperable with said shearing member to shear one of the body portions of the stock material upon relative movement between said shearing member and said first die member, and having a cutting edge cooperable with said perforating member to form at least a portion of the aperture in the part upon relative movement between said perforating and said die member;

a second die member adjacent said first die member having a shearing edge which forms a continuation of the shearing edge of said first die member and which extends, at least in part, relative to the shearing edge of said first die member at an angle substantially corresponding to the angle at which the two body portions of the stock material extend relative to one another, the shearing edge of said second die member being cooperable with said shearing member to shear the other body portion of the stock material upon relative movement between said shearing member and said second die member, and said first and second die members being removable from the apparatus for sharpening of the shearing and cutting edges; and means for relocating said first and second die members in the apparatus with the sharpened edges in their original positions with respect to one another and the remainder of the apparatus.

2. Apparatus for forming a piece part from stock material having at least two intersecting portions wherein the piece part is to have at least one aperture formed therethrough, which apparatus comprises:

a shearing member;

a perforating member adjacent said shearing member;

a first die member having a shearing edge cooperable with said shearing member to shear one of the intersecting portions of the stock material upon relative movement between said shearing member and said first die member, and having a cutting edge defined by an opening in a surface thereof and cooperable with said perforating member to form at least a portion of the aperture in the part upon movement of said perforating member into the opening in said die member;

a second die member adjacent said first die member having a shearing edge which forms a continuation of the shearing edge of said first die member and which is cooperable with said shearing member to shear the other intersecting portion of the stock material upon relative movement between said shearing member and said second die member, said first and second die members being removable from the apparatus for sharpening of the shearing and cutting edges; and means for relocating said first and second die members in the apparatus with the sharpened edges in their original positions with respect to one another and the remainder of the apparatus.

3. Apparatus for forming a piece part from stock material having at least two intersecting portions wherein the piece part is to have at least two intersecting portions and is to have at least one opening formed therein with the central axis of the opening located a prescribed distance from one end of one of the intersecting portions of the part, which apparatus comprises:

a shearing member;

a forming member adjacent said shearing member;

a first die member having a shearing edge defined by intersecting surfaces thereof and cooperable with said shearing member to shear one of the intersecting portions of the stock material to form the one end of the one intersecting portion of the part upon relative movement between said shearing member and said die member, and having a forming edge defined by an opening in a surface thereof and cooperable with said forming member to form at least a portion of the opening in the part upon relative movement between said forming member and said die member, the central axis of the opening in said die member extending parallel to one of the intersecting surfaces of said die member and being spaced therefrom the prescribed distance that the opening in the part is to be located from the one end of the one intersecting portion of the part;

a second die member adjacent said first die member and having a shearing edge which forms a continuation of the shearing edge defined by the intersecting surfaces of said first die member and which is cooperable with said shearing member to shear the other intersecting portion of the stock material upon relative movement between said shearing member and said second die member, said die members being removable from the apparatus for sharpening of the shearing and forming edges; and means for relocating said die members in the apparatus with the sharpened edges in their original positions with respect to one another and the remainder of the apparatus.

4. Apparatus for forming a substantially channel-shaped piece part from channel-shaped stock material having a base portion and leg portions intersecting the base portion, wherein the piece part is to have at least one opening formed in a base portion thereof, which apparatus comprises:

first and second forming members;

a first die member having a first forming edge cooperable with said first forming member to perform a forming operation on part of the base portion of the stock material upon relative movement between said first forming member and said die member, and having a second forming edge cooperable with said second forming member to form the opening in the base portion of the part upon relative movement between said second forming member and said die member;

second and third die members on opposite sides of said first die member and having forming edges which form continuations of the first forming edge of said first die member and which are cooperable with said first forming member to perform a forming operation on a part of the leg portions of the stock material upon relative movement between said first forming member and said second and third die members, said several die members being removable from the apparatus for sharpening of their respective forming edges; and means for relocating said several die members in the apparatus with the sharpened forming edges in their original positions with respect to one another and the remainder of the apparatus.

5. Apparatus for forming a substantially channel-shaped piece part from channel-shaped stock material having a base portion and leg portions intersecting the base portion, wherein the piece part is to have at least one opening formed in a base portion thereof with the central axis of the opening located a prescribed distance from one end of the base portion, which apparatus comprises:

a shearing member extending substantially transversely with respect to the stock material;

a perforating member adjacent said shearing member;

a first die member having surfaces which intersect to define a shearing edge cooperable with said shearing member to shear the base portion of the stock material to form the one end of the base portion upon relative movement between said shearing member and said die member, and having a cutting edge defined by an opening in a surface thereof and cooperable with said perforating member to form the aperture in the base portion of the part upon movement of said perforating member into the opening in said die member, the central axis of the opening in said die member extending parallel to one of the intersecting surfaces of said die member and being spaced therefrom the prescribed distance that the aperture in the base portion of the part is to be located from the one end of the base portion;

second and third die members on opposite sides of said first die member and having shearing edges which form continuations of the shearing edge defined by the intersecting surfaces of said first die member and which are cooperable with said shearing member to shear the leg portions of the stock material upon relative movement between said shearing member and said second and third die members, said several die members being removable from the apparatus for sharpening of the shearing and cutting edges; and means for relocating said several die members in the apparatus with the sharpened edges in their original positions with respect to one another and the remainder of the apparatus.

6. Apparatus for forming piece parts from stock material having at least two intersecting portions as the stock material is intermittently advanced through the apparatus with the line of intersection of the portions parallel to the path of movement of the stock material, wherein each of the piece parts is to have spaced openings formed therein, which apparatus comprises:

a first forming member extending substantially transversely with respect to the path of movement of the stock material;

a second forming member adjacent a side of said first forming member which faces the direction from which the stock material is advanced;

a third forming member adjacent the opposite side of said first forming member;

first die members having spaced opposed first forming edges which cooperate with said first forming member to perform a forming operation on a part of one of the intersecting portions of the stock material upon relative movement between said first forming member and said die members, and said die members having additional forming edges which are cooperable with said second and third forming members for at least partially forming the openings in the parts upon relative movement between said second and third forming members and said die members;

second die members adjacent said first die members also having spaced opposed forming edges which form continuations of respective ones of the first forming edges of said first die members and which are cooperable with said first forming member to perform a forming operation on a part of the other intersecting portion of the stock material upon relative movement between said first forming member and said second die members, said first and second die members being removable from the apparatus for sharpening of their respective forming edges; and means for relocating said first and second die members in the apparatus with the sharpened forming edges in their original positions with respect to one another and the remainder of the apparatus.

7. Apparatus for forming piece parts from stock material having at least two intersecting portions as the stock material is intermittently advanced through the apparatus with the line of intersection of the portions parallel to the path of movement of the stock material, wherein each of the piece parts is to have spaced apertures formed therein, which apparatus comprises:

a shearing member extending substantially transversely with respect to the path of movement of the stock material;

at least one perforating member adjacent a side of said shearing member which faces the direction from which the stock material is advanced;

at least one perforating member adjacent the opposite side of said shearing member;

first die members having spaced opposed surfaces defining a portion of a slot for receiving said shearing member for the shearing of the parts from the stock material, said die members also having surface portions intersecting respective ones of the opposed surfaces of said die members to define shearing edges which cooperate with said shearing member to shear one of the intersecting portions of the stock material upon movement of said shearing member into the shearing member receiving slot, and said die members having cutting edges adjacent opposite sides of the slot which are defined by openings in surfaces of said die members and which are cooperable with said perforating members for forming the apertures in the parts upon movement of said perforating members into the openings in said die members;

second die members adjacent said first die members having opposed surfaces defining another portion of the shearing member receiving slot and having surface portions intersecting respective ones of the opposed surfaces to define shearing edges which form continuations of respective ones of the shearing edges of said first die members and which are cooperable with said shearing member to shear the other intersecting portion of the stock material upon movement of said shearing member into the slot, said first and second die members being removable from the apparatus for sharpening of the shearing and cutting edges; and means for relocating said first and second die members in the apparatus with the sharpened edges in their original positions with respect to one another and the remainder of the apparatus.

8. Apparatus for forming piece parts from stock material having at least two intersecting portions as the stock material is intermittently advanced through the apparatus with the line of intersection of the portions parallel to the path of movement of the stock material, wherein each of the piece parts is to have at least two intersecting portions and is to have spaced openings formed therein with the central axes of the openings located at prescribed distances from respective ends of one of the intersecting portions of the part, with apparatus comprises:

a shearing member extending substantially transversely with respect to the path of movement of the stock material;

a first forming member adjacent a side of said shearing member which faces the direction from which the stock material is advanced;

a second forming member adjacent the opposite side of said shearing member;

first die members having spaced opposed surfaces defining a portion of a slot for receiving said shearing member for the shearing of the parts from the stock material, said die members also having surface portions intersecting respective ones of their opposed surfaces to define shearing edges which cooperate with said shearing member to shear the intersecting portion of the stock material corresponding to the one intersecting portion of each part upon relative movement between said shearing member and said die members, and said die members having forming edges adjacent opposite sides of the shearing member receiving slot which are defined by openings in surfaces of said die members and which are cooperable with said forming members for forming the openings in the parts upon relative movement between said forming members and said die members, the central axes of the openings in said die members extending parallel to respective ones of the opposed surfaces of said die members and being spaced therefrom distances equal to the prescribed distances which the central axes of the respective openings in each part are to be located from the ends of the one intersecting portion of the part;

second die members adjacent said first die members having opposed surfaces defining another portion of the shearing member receiving slot and having surface portions intersecting respective ones of the opposed surfaces to define shearing edges which form continuations of respective ones of the shearing edges of said first die members and which are cooperable with said shearing member to shear the other intersecting portion of the stock material upon relative movement between said shearing member and said second die members, said first and second die members being removable from the apparatus for sharpening of the shearing and forming edges; and means for relocating said die members in the apparatus with the sharpened edges in their original positions with respect to one another and the remainder of the apparatus.

9. Apparatus for forming channel-shaped piece parts from channel-shaped stock material having a base portion and leg portions intersecting the base portion as the stock material is intermittently advanced longitudinally through the apparatus, wherein each of the piece parts is to have spaced apertures formed through a base portion thereof adjacent opposite ends of the base portion with the central axes of the apertures located at prescribed distances from the ends, apparatus comprises:

a shearing member extending substantially transversely with respect to the path of movement of the stock material;

at least one perforating member adjacent a side of said shearing member which faces the direction from which the stock material is advanced;

at least one perforating member adjacent the opposite side of said shearing member;

first die members having spaced opposed parallel surfaces defining a portion of a slot for receiving said shearing member for the shearing of the parts from the stock material, said die members also having coplanar surfaces for engaging the base portions of the stock material on opposite sides of the slot and intersecting respective ones of the opposed surfaces of said die members to define shearing edges which cooperate with said shearing member to shear the base portion of the stock material upon movement of said shearing member into the slot, and said die members having apertures opening through the coplanar surfaces of said die members to define cutting edges which are cooperable with said perforating members for forming the apertures in the base portions of the parts, the central axes of the apertures through said die members extending parallel to the opposed parallel surfaces of said die members and being spaced from respective ones of the opposed parallel surfaces distances equal to the prescribed distances which the axes of the respective apertures in the parts are to be located from the ends of the base portions of the parts;

second die members at opposite sides of each of said first die members, said second die members having opposed surfaces defining additional portions of the shearing member receiving slot and having surfaces for engaging the leg portions of the stock material one opposite sides of the slot and which intersect respective ones of the opposed surfaces of said second die members to form shearing edges which form continuations of respective ones of the shearing edges of said first die members and which are cooperable with said shearing member to shear the legs of the stock material upon movement of said shearing member into the slot, said first and second die members being removable from the apparatus for sharpening of the shearing and cutting edges with the shearing and cutting edges of said first die members being sharpenable by the grinding down of the coplanar surfaces thereof and with the shearing edges of said second die members being sharpenable by the grinding down of the opposed surfaces thereof; and means for relocating said first and second die members in the apparatus with the sharpened edges in their original positions with respect to one another and the remainder of the apparatus.

References Cited by the Examiner
UNITED STATES PATENTS

| | | | |
|---|---|---|---|
| 1,351,115 | 8/1920 | Morse | 83—700 X |
| 1,436,006 | 10/1922 | Beans | 83—682 |
| 1,666,344 | 4/1928 | Ovestrud | 83—620 X |

WILLIAM W. DYER, Jr., *Primary Examiner.*

L. B. TAYLOR, *Assistant Examiner.*